US012789222B2

(12) United States Patent
Liu

(10) Patent No.: US 12,789,222 B2
(45) Date of Patent: Nov. 10, 2026

(54) DISPENSING METHOD FOR DISPLAY PANEL AND DISPENSING DEVICE FOR DISPLAY PANEL

(71) Applicant: Wuhan China Star Optoelectronics Technology Co., Ltd., Wuhan (CN)

(72) Inventor: Biwu Liu, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 227 days.

(21) Appl. No.: 17/610,713

(22) PCT Filed: Aug. 30, 2021

(86) PCT No.: PCT/CN2021/115406
§ 371 (c)(1),
(2) Date: May 9, 2023

(87) PCT Pub. No.: WO2023/010633
PCT Pub. Date: Sep. 2, 2023

(65) Prior Publication Data
US 2024/0033773 A1 Feb. 1, 2024

(30) Foreign Application Priority Data
Aug. 3, 2021 (CN) ......................... 202110884078.4

(51) Int. Cl.
*B05C 11/10* (2006.01)
*B05C 5/02* (2006.01)
*B05C 13/02* (2006.01)

(52) U.S. Cl.
CPC ........ *B05C 11/1015* (2013.01); *B05C 5/0275* (2013.01); *B05C 13/02* (2013.01)

(58) Field of Classification Search
None
See application file for complete search history.

(56) References Cited

U.S. PATENT DOCUMENTS

2019/0254178 A1* 8/2019 Chen .................... G02F 1/1303

FOREIGN PATENT DOCUMENTS

CN 106269397 A 1/2017
CN 106493042 A 3/2017
(Continued)

OTHER PUBLICATIONS

English translation of CN106493042 (year: 2025).*

*Primary Examiner* — Michael P. Rodriguez
(74) *Attorney, Agent, or Firm* — Nathan & Associates Patent Agents Ltd.; Menachem Nathan

(57) ABSTRACT

The present application provides a dispensing method for a display panel and a dispensing device for the display panel. The dispensing method for the display panel includes: scanning an outline of a position to be dispensed of the display panel to obtain a dispensing parameter of the display panel; determining whether the dispensing parameter satisfies a preset dispensing condition; dispensing glue on the display panel when the dispensing parameter satisfies the preset dispensing condition. The dispensing method for the display panel provided in the present application can monitor the display panel to be dispensed, so as to dispense glue on the display panel meeting the dispensing condition, thereby improving product yield of the display panel.

13 Claims, 10 Drawing Sheets

(56) References Cited

FOREIGN PATENT DOCUMENTS

| | | | | | |
|---|---|---|---|---|---|
| CN | 106980194 | A | | 7/2017 | |
| CN | 106994429 | A | | 8/2017 | |
| CN | 109482440 | A | | 3/2019 | |
| CN | 109550649 | A | * | 4/2019 | ......... B05C 11/1015 |
| CN | 110420804 | A | | 11/2019 | |
| CN | 212018389 | U | | 11/2020 | |
| CN | 112495700 | A | | 3/2021 | |
| CN | 112525075 | A | | 3/2021 | |
| CN | 212943868 | U | | 4/2021 | |
| CN | 113245149 | A | | 8/2021 | |
| CN | 113600440 | A | | 11/2021 | |
| JP | 2007007639 | A | | 1/2007 | |
| TW | 201718104 | A | | 6/2017 | |

* cited by examiner

DISPENSING METHOD FOR DISPLAY PANEL AND DISPENSING DEVICE FOR DISPLAY PANEL

FIELD OF INVENTION

The present disclosure relates to a display field, specifically to a dispensing method for a display panel and a dispensing device for the display panel.

BACKGROUND OF INVENTION

At present, display panels have a development trend toward a full screen and a narrow bezel. The display panels include a protective cover plate, a liquid crystal assembly, and a backlight assembly. After the liquid crystal assembly and the backlight assembly are bonded together, the protective cover plate is provided above the liquid crystal assembly to increase a service life of the display panel. In order to improve a degree of bonding between the backlight assembly and the liquid crystal assembly, glue is usually dispensed on sides of the backlight assembly and the liquid crystal assembly after the liquid crystal assembly, the backlight assembly, and the protective cover plate are bonded. However, due to a lack of monitoring of the display panel to be dispensed in current dispensing devices, a dispensing device performs a dispensing process on the display panel that does not meet the dispensing conditions, resulting in a low yield of the display panel.

SUMMARY OF INVENTION

Technical Problem

The present application provides a dispensing method for a display panel and a dispensing device for the display panel to improve a product yield of the display panel.

Technical Solution

The present application provides a dispensing method for a display panel, comprising:

scanning an outline of a position to be dispensed of the display panel to obtain a dispensing parameter of the display panel;

determining whether the dispensing parameter satisfies a preset dispensing condition; and dispensing glue on the display panel when the dispensing parameter satisfies the preset dispensing condition.

In some embodiments, before the step of scanning the outline of the position to be dispensed of the display panel, the dispensing method further comprises:

fixing the display panel on a dispensing platform;

determining whether the position to be dispensed of the display panel is in a horizontal state; and calibrating the position to be dispensed of the display panel to the horizontal state when the position to be dispensed of the display panel is not in the horizontal state.

In some embodiments, the step of determining whether the position to be dispensed of the display panel is in the horizontal state, and calibrating the display panel to the horizontal state when the position to be dispensed of the display panel is not in the horizontal state, comprises following steps:

rotating the dispensing platform to a first preset angle so that a first side of the display panel is in a waiting-to-be-dispensed state;

determining whether the first side is in the horizontal state;

calibrating the first side of the display panel to the horizontal state when the first side is not in the horizontal state;

rotating the dispensing platform to a second preset angle when the first side is in the horizontal state so that a second side of the display panel is in the waiting-to-be-dispensed state;

determining whether the second side is in the horizontal state;

rotating the dispensing platform to a third preset angle when the second side is in the horizontal state so that a third side of the display panel is in the waiting-to-be-dispensed state;

determining whether the third side is in the horizontal state; and the display panel satisfies a first dispensing condition when the third side is in the horizontal state.

In some embodiments, the step of determining whether the first side is in the horizontal state comprises:

measuring vertical heights of at least two points on the first side from a same horizontal plane; and determining whether a difference between any two of the vertical heights of the first side satisfies a preset value, the first side is in the horizontal state when the difference between any two of the vertical heights on the first side satisfies the preset value;

the step of determining whether the second side is in the horizontal state comprises:

measuring vertical heights of at least two points on the second side from a same horizontal plane; and determining whether a difference between any two of the vertical heights on the second side satisfies the preset value, the second side is in the horizontal state when the difference between any two of the vertical heights on the second side satisfies the preset value; and the step of determining whether the third side is in the horizontal state comprises:

measuring vertical heights of at least two points on the third side from a same horizontal plane; and determining whether a difference between any two of the vertical heights on the third side satisfies the preset value, and the third side is in the horizontal state when the difference between any two of the vertical heights on the third side satisfies the preset value.

In some embodiments, when the display panel satisfies the first dispensing condition, anchor points on the display panel are identified, and a dispensing path of the display panel is acquired.

In some embodiments, the anchor points comprise at least a first anchor point, a second anchor point, a third anchor point, a fourth anchor point, a fifth anchor point, and a sixth anchor point, the first side comprises at least the first anchor point and the second anchor point, the second side comprises at least the third anchor point and the fourth anchor point, and the third side comprises at least the fifth anchor point and the sixth anchor point.

In some embodiments, a step of identifying the anchor points on the display panel comprises:

identifying at least the sixth anchor point and the fifth anchor point on the third side;

rotating the dispensing platform to the second preset angle;

identifying at least the fourth anchor point and the third anchor point on the second side;

rotating the dispensing platform to the first preset angle; and identifying at least the second anchor point and the first anchor point on the first side.

In some embodiments, the step of scanning the outline of the position to be dispensed of the display panel to obtain the dispensing parameter of the display panel comprises:

scanning an outline of the first side to obtain a first sub-dispensing parameter;

rotating the dispensing platform to the second preset angle;

scanning an outline of the second side to obtain a second sub-dispensing parameter;

rotating the dispensing platform to the third preset angle; and scanning an outline of the third side to obtain a third sub-dispensing parameter, the first sub-dispensing parameter, the second sub-dispensing parameter, and the third sub-dispensing parameter constitute the dispensing parameter.

In some embodiments, a step of identifying the anchor points on the display panel comprises:

rotating the dispensing platform to the first preset angle;

identifying the first anchor point and the second anchor point on the first side;

rotating the dispensing platform to the second preset angle;

identifying the third anchor point and the fourth anchor point on the second side;

rotating the dispensing platform to the third preset angle; and identifying the fifth anchor point and the sixth anchor point on the third side.

In some embodiments, the step of scanning the outline of the position to be dispensed of the display panel to obtain the dispensing parameter of the display panel comprises:

scanning an outline of the third side to obtain a fourth sub-dispensing parameter;

rotating the dispensing platform to the second preset angle;

scanning an outline of the second side to obtain a fifth sub-dispensing parameter;

rotating the dispensing platform to the first preset angle; and scanning an outline of the first side to obtain a sixth sub-dispensing parameter, the fourth sub-dispensing parameter, the fifth sub-dispensing parameter, and the sixth sub-dispensing parameter constitute the dispensing parameter.

In some embodiments, the first anchor point is a start point of the dispensing path, and the sixth anchor point is an end point of the dispensing path; or the first anchor point is the end point of the dispensing path, and the sixth positioning point is the start point of the dispensing path.

In some embodiments, the step of dispensing the glue on the display panel comprises:

dispensing the glue on the display panel according to a dispensing path.

Accordingly, the present application also provides a dispensing device for a display panel, comprising:

a scanning component for scanning an outline of a position to be dispensed of the display panel to obtain a dispensing parameter of the display panel;

a determination component for determining whether the dispensing parameter satisfies a preset dispensing condition;

an execution component for receiving an instruction from the determination component, and glue is dispensed on the display panel when the dispensing parameter satisfies the preset dispensing condition.

In some embodiments, the dispensing device for the display panel further comprises a fixing component for fixing the display panel.

In some embodiments, the fixing component comprises a dispensing platform and a pressure retaining plate.

In some embodiments, the dispensing device for the display panel further comprises a height measuring component for determining whether a position to be dispensed of the display panel is in a horizontal state.

In some embodiments, the dispensing device for the display panel further comprises a calibration component for calibrating the position to be dispensed of the display panel to a horizontal state.

In some embodiments, the dispensing device for the display panel further comprises an identification component for recognizing anchor points of the display panel and obtaining a dispensing path of the display panel.

In some embodiments, the scanning component comprises a 2D line laser or a 2D high definition camera.

Advantageous Effects

The present application provides a dispensing method and a dispensing device for a display panel. The dispensing method for a display panel includes: scanning an outline of a position to be dispensed of the display panel, and obtaining a dispensing parameter of the display panel; determining whether the dispensing parameter satisfies a preset dispensing condition; dispensing glue on the display panel when the dispensing parameter satisfies the preset dispensing condition. The dispensing method for the display panel provided in the present application can monitor the display panel to be dispensed, and dispense glue on the display panel meeting the dispensing conditions, thereby improving the product yield of the display panel.

DESCRIPTION OF DRAWINGS

In order to more clearly explain the technical solutions in the present application, the following will briefly introduce the drawings required in the description of the embodiments. Obviously, the drawings in the following description are only some embodiments of the present disclosure. For those skilled in the art, without paying any creative work, other drawings can be obtained based on these drawings.

DETAILED DESCRIPTION OF EMBODIMENTS

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present disclosure.

Technical solutions in embodiments of the present application will be clearly and completely described below in conjunction with drawings in the embodiments of the present application. It should be noted that in the embodiments of the present invention, it should be understood that terms such as “including”, “having” or the like are intended to indicate presence of the features, numbers, steps, behaviors, components, parts or combinations thereof disclosed in this specification, and not intended to exclude the possibility of addition or presence of one or more other features, numbers, steps, behaviors, components, parts or combinations thereof. In various embodiments of the present invention, it should be understood that the size of the sequence number of the following processes does not mean the order of execution, the execution order of each process should be determined by its function and internal logic, and the sequence number of the following processes should not constitute any limitation on the implementation process of the embodiments of the present invention.

The present application provides a dispensing method for a display panel and a dispensing device for a display panel. The following describes the present application in detail with reference to specific embodiments.

Figure 1:
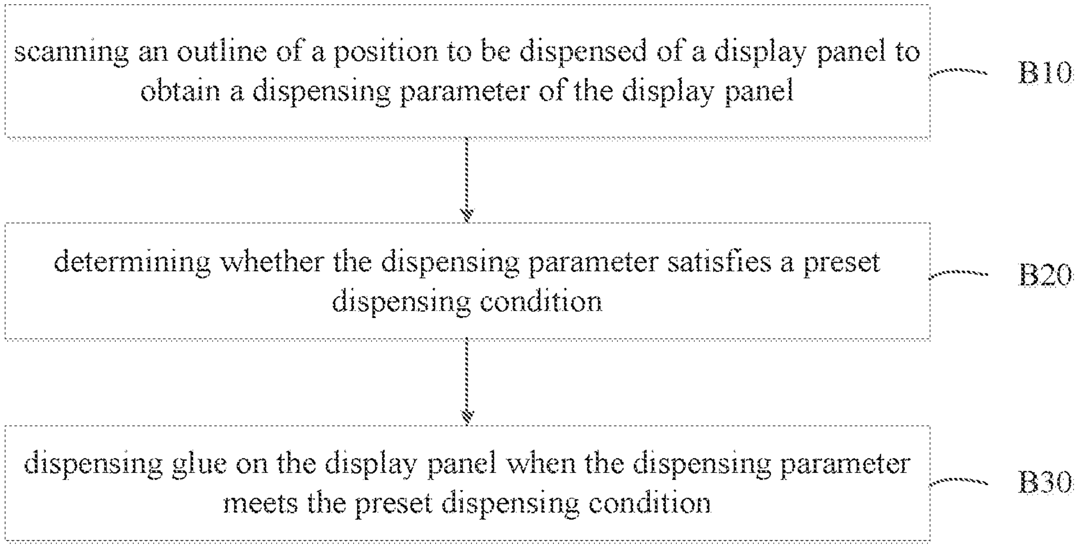
FIG. 1 is a flowchart of a first embodiment of a dispensing method for a display panel according to the present application.
Figure 2:
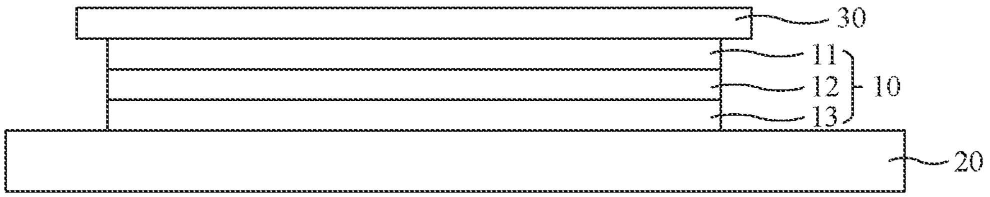
FIG. 2 is a schematic diagram of a display panel fixed onto a dispensing platform according to an embodiment of the present application.

Referring to FIG. 1, FIG. 1 is a flowchart of a first embodiment of a dispensing method for a display panel according to the present application. FIG. 2 is a schematic diagram of a display panel fixed onto a dispensing platform according to an embodiment of the present application.

A dispensing method for a display panel includes:

Step B10: scanning an outline of a position to be dispensed of a display panel to obtain dispensing parameters of the display panel.

As shown in FIG. 2, a display panel 10 includes a protective cover plate 11, a liquid crystal panel 12, and a backlight assembly 13 which are sequentially stacked. In order to improve the stability of the display panel 10, glue is usually dispensed to sides of the display panel 10 after the protective cover plate 11, the liquid crystal panel 12, and the backlight assembly 13 are bonded. Before dispensing the glue to the sides of the display panel 10, the dispensing parameters of the display panel 10 need to be acquired by scanning the outline of the position of the display panel 10 to be dispensed. A 2D line laser or a 2.5D high-definition camera may be used to scan the outline of the position of the display panel to be dispensed. Specifically, when the outline of the position to be dispensed of the display panel 10 is scanned with a 2D line laser, the 2D line laser and the position to be dispensed of the display panel 10 are in a perpendicular state. When the outline of the position to be dispensed of the display panel 10 is scanned with the 2.5D high-definition camera, the 2.5D high-definition camera is located directly above the position to be dispensed of the display panel 10. In the present application, by obtaining the dispensing parameters of the display panel 10, the dispensing accuracy of the display panel 10 can be improved, and the product yield of the display panel 10 can be improved.

As an example of the present application, the outline of the position to be dispensed of the display panel 10 is scanned by a 2D line laser. The display panel 10 includes a plurality of film layers stacked on each other. Due to different lengths of the film layers, the display panel 10 has side edges with a height fluctuation, that is, the height fluctuation defines a height and a width of the position to be dispensed of the side edges. Specifically, the 2D line laser and the display panel 10 are in the perpendicular state, the position to be dispensed of the display panel 10 is scanned up and down to obtain the height and width of the position to be dispensed of the display panel 10, and a volume of the position to be dispensed of the display panel 10 can be obtained by combining a thickness of the display panel 10. It will be appreciated that the display panel 10 may have one, two, or more positions to be dispensed. A number of positions of the display panel 10 to be dispensed is not limited here. As an example of the present application, the positions of to be dispensed of the display panel 10 are the three sides of the display panel.

Step B20: determining whether the dispensing parameters satisfy a preset dispensing condition.

The preset dispensing condition is a range of dispensing volume that the dispensing device needs to satisfy in order to perform a dispensing operation. It will be appreciated that preset dispensing conditions include a maximum dispensing volume and a minimum dispensing volume.

In the present application, it is possible to monitor the position of the display panel 10 to be dispensed by setting the preset dispensing conditions and determining whether the dispensing parameters meet the preset dispensing conditions.

Step B30: dispensing the glue on the display panel when the dispensing parameters meet the preset dispensing conditions.

In some embodiments, the dispensing of the display panel is abandoned when the dispensing parameters do not meet the preset dispensing conditions.

Specifically, when a volume tolerance between an actual dispensing volume and a preset dispensing volume is within plus or minus 10%, it can be determined that the dispensing parameters satisfy the preset dispensing conditions. The dispensing device may dispense the glue on the display panel 10. Conversely, the dispensing device abandons dispensing the glue on the display panel 10.

According to the dispensing method for the display panel provided in the present application, by scanning the outline of the position to be dispensed of the display panel, obtaining the dispensing parameters of the display panel, and determining whether the dispensing parameters meet the preset dispensing conditions, it is possible to monitor whether the dispensing position of the display panel satisfies the preset dispensing conditions, to dispense the glue on the display panel meeting the preset dispensing conditions, and to abandon the dispensing of the display panel not meeting the preset dispensing conditions, thereby improving the product yield of the display panel.

Figure 3:
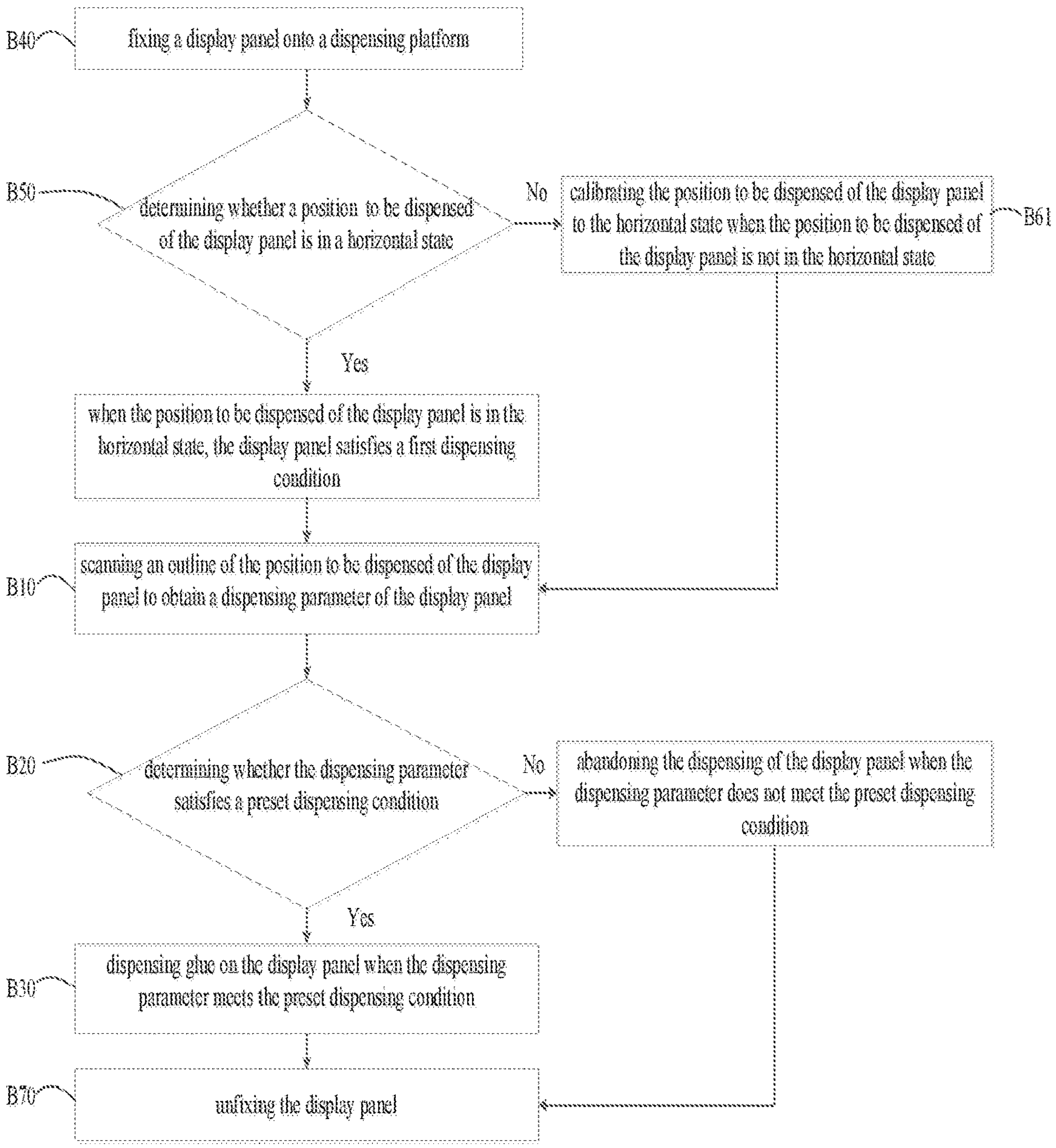
FIG. 3 is a flowchart of a second embodiment of a dispensing method for a display panel according to the present application.
Figure 4:
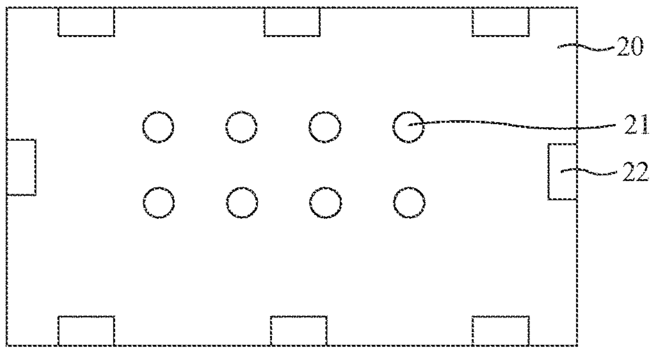
FIG. 4 is a schematic structural diagram of a dispensing platform according to an embodiment of the present application.
Figure 5:
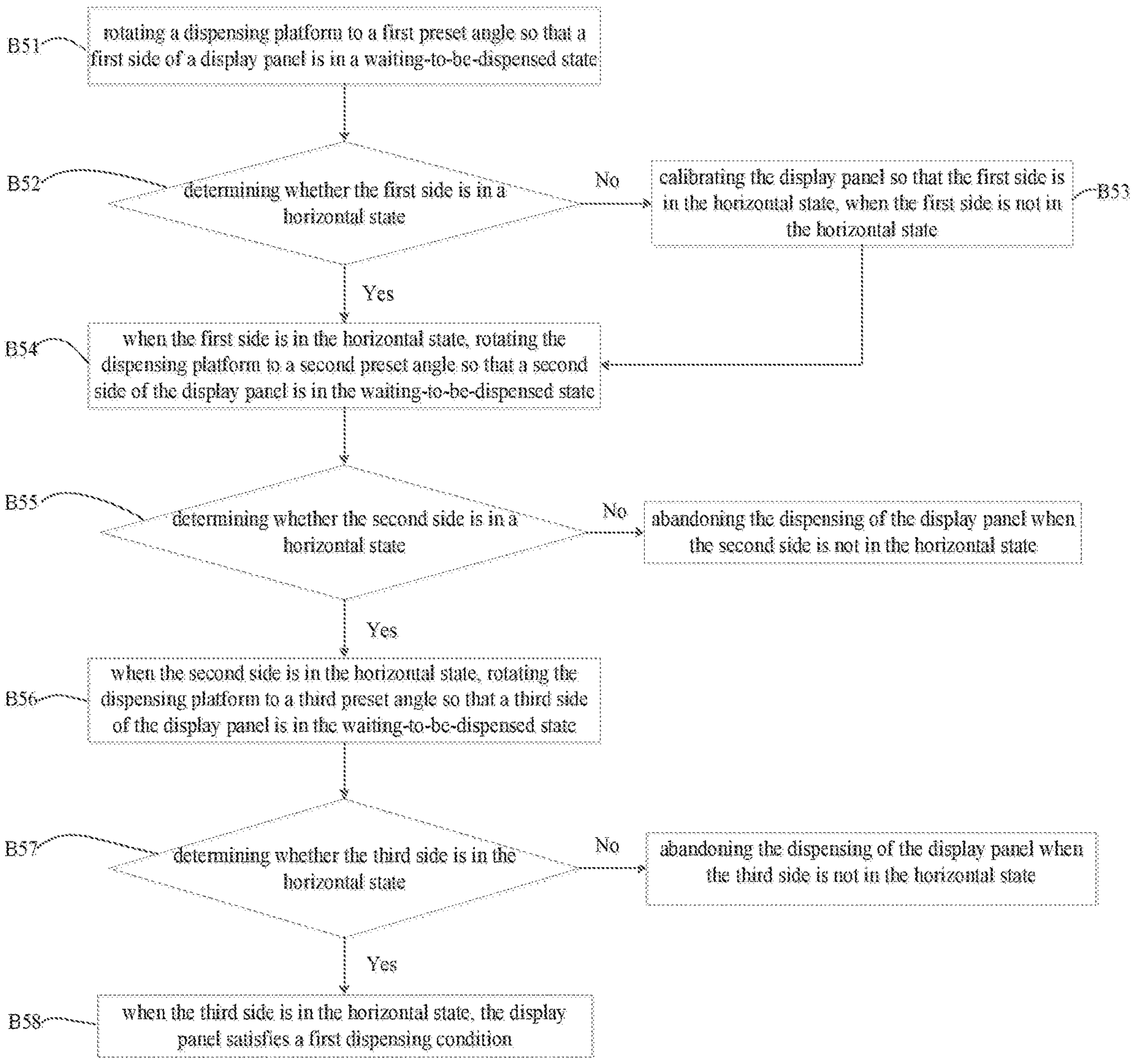
FIG. 5 is a flowchart for determining whether a position to be dispensed of the display panel is in a horizontal state and calibrating the position to be dispensed of the display panel to the horizontal state in the dispensing method for the display panel according to the present application.

Referring to FIGS. 3-4, FIG. 3 is a flowchart of a second embodiment of a dispensing method for a display panel according to the present application. FIG. 4 is a schematic structural diagram of a dispensing platform according to an embodiment of the present application.

Wherein the dispensing parameters of the display panel are acquired by scanning the outline of the position to be dispensed of the display panel; determine whether the dispensing parameters meet the preset dispensing conditions; when the dispensing parameters meet the preset dispensing conditions, the glue is dispensed on the display panel, as described above, and details are not described here.

A second embodiment of the dispensing method for the display panel provided by the present application differs from the first embodiment in that: before the outline of the position of the display panel to be dispensed is scanned, the method may further include:

step B40: fixing the display panel onto a dispensing platform.

In conjunction with FIGS. 2 and 4, the dispensing device includes a dispensing platform 20 and a pressure retaining plate 30. A plurality of vacuum holes 21 are defined at a central position on the dispensing platform 20. A plurality of magnetic blocks 22 are provided at edge positions of the dispensing platform 20. The pressure retaining plate 30 is formed of a magnetic material. The display panel 10 to be dispensed is placed at the central position of the dispensing platform 20, and then the pressure retaining plate 30 is covered above the display panel 10. The pressure retaining plate 30 and the magnetic block 22 can attach to and fix the display panel 10. The dispensing device also includes an evacuating means (not shown) connected to the dispensing platform 20. The evacuating means connected to the dispensing platform 20 is activated, and the display panel 10 to be dispensed is fixed between the dispensing platform 20 and the pressure retaining plate 30 by evacuation. The dispensing platform 20 has functions of rotating and moving.

In the present application, the display panel is fixed between the dispensing platform and the pressure retaining plate. When the dispensing platform is moved, the dispensing platform can drive the display panel 10 to be dispensed to move, thereby improving the accuracy of the dispensing of the display panel 10.

Step B50: determining whether the position to be dispensed of the display panel is in a horizontal state.

When the dispensing process is performed on the display panel 10, in order to avoid a collision between a dispensing head 40 and the display panel 10 which resulting in damage to the display panel 10, and at the same time to improve the accuracy of dispensing glue on the display panel 10, before the dispensing of the display panel 10, it is necessary to ensure that the position to be dispensed of the display panel 10 is in a horizontal state so as to ensure that the dispensing head 40 of the dispensing device does not collide with the display panel 10, thereby avoiding damage to the display panel 10 and improving the accuracy of dispensing glue on the display panel 10.

Step B61: calibrating the position to be dispensed of the display panel to the horizontal state when the position to be dispensed of the display panel is not in the horizontal state.

Specifically, the display panel 10 is fixed between the dispensing platform 20 and the pressure retaining plate 30, and the dispensing platform 20 can drive the display panel 10 to move by moving the dispensing platform 20. Therefore, by moving the dispensing platform 20, the position of the display panel 10 can be calibrated so that the position to be dispensed of the display panel 10 is in the horizontal state.

It can be understood that when the position to be dispensed of the display panel is in the horizontal state, the display panel satisfies a first dispensing condition, and step B10 may be directly performed.

After performing the dispensing process on the display panel, the method may further include:

Step B70: unfixing the display panel.

Specifically, after the dispensing of the display panel 10 is completed, the display panel 10 can be unfixed by releasing the pressure retaining plate 30.

Figure 6:
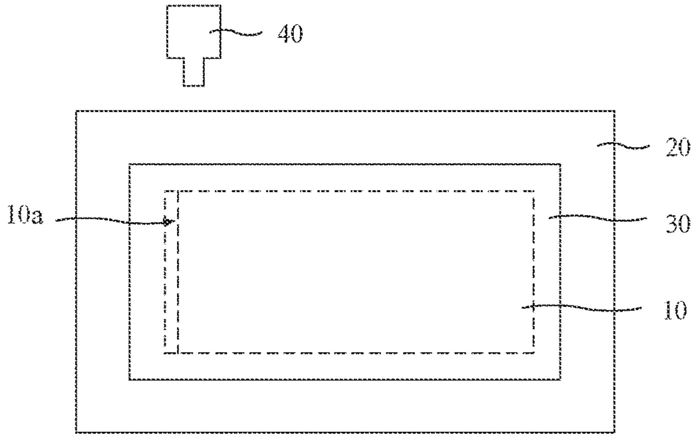
FIG. 6 is a schematic diagram of a first side of a display panel in a waiting-to-be-dispensed state according to an embodiment of the present application.
Figure 7:
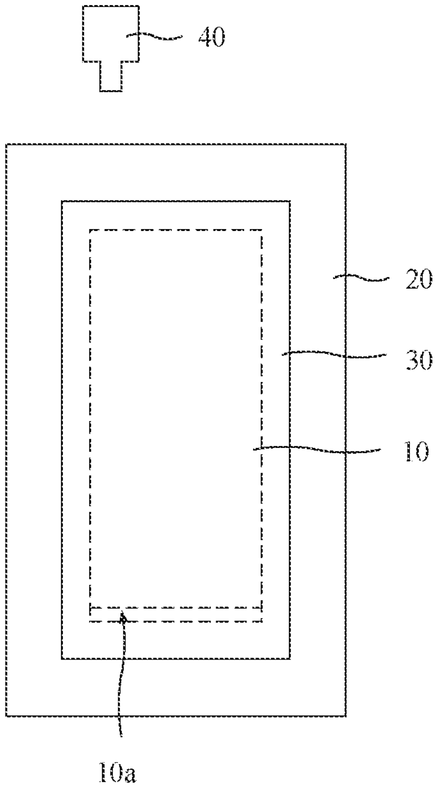
FIG. 7 is a schematic diagram of a second side of a display panel in a waiting-to-be-dispensed state according to an embodiment of the present application.
Figure 8:
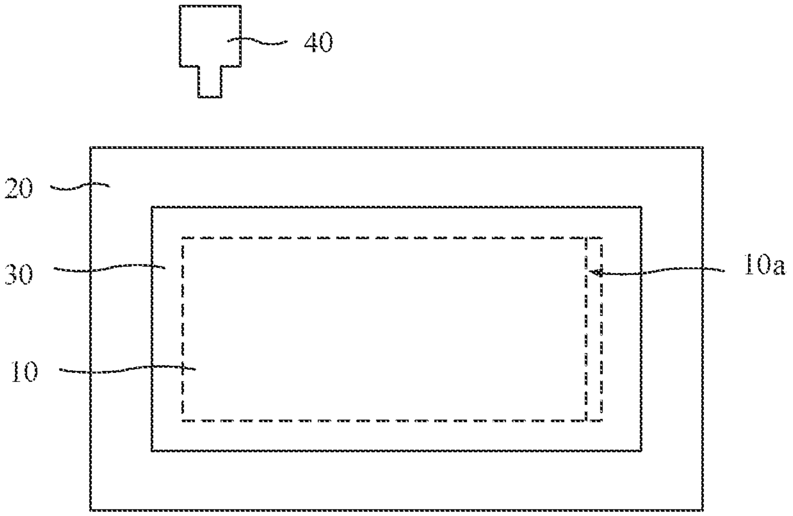
FIG. 8 is a schematic diagram of a third side of a display panel in a waiting-to-be-dispensed state according to an embodiment of the present application.

Referring to FIGS. 5-8, FIG. 5 is a flowchart for determining whether the position to be dispensed of the display panel is in the horizontal state and calibrating the position to be dispensed of the display panel to the horizontal state in the dispensing method for the display panel according to the present application. FIG. 6 is a schematic diagram of a first side of a display panel in a waiting-to-be-dispensed state according to an embodiment of the present application. FIG. 7 is a schematic diagram of a second side of a display panel in a dispensing state according to an embodiment of the present application. FIG. 8 is a schematic diagram of a third side of a display panel in a waiting-to-be-dispensed state according to the embodiment of the present application.

In the dispensing method for the display panel provided in the present application, it is determined whether the position to be dispensed of the display panel is in a horizontal state, when the position to be dispensed of the display panel is not in a horizontal state, the step of calibrating the position to be dispensed of the display panel to the horizontal state may include:

step B51: rotating the dispensing platform to a first preset angle so that the first side of the display panel is in a waiting-to-be-dispensed state.

Referring to FIGS. 2 and 6, specifically, when the dispensing platform 20 is in the horizontal state, the dispensing platform 20 is rotated from the original horizontal state to a vertical state. The dispensing platform 20 may be rotated 90° clockwise or counterclockwise to reach the first preset angle. The example in which the dispensing platform 20 is rotated 90° clockwise to reach the first preset angle is shown in the present application, but it does not constitute a limitation to this application. As shown in FIG. 6, the display panel 10 includes a binding area 10*a*. When the dispensing platform 20 is rotated to reach the first preset angle, the dispensing platform 20 also drives the display panel 10 to rotate. When the dispensing platform 20 reaches the first preset angle, the display panel 10 reaches the first preset angle, and at this time, the first side of the display panel 10 is in the waiting-to-be-dispensed state. The first preset angle refers to an angle at which the dispensing platform is located when the first side of the display panel is in the waiting-to-be-dispensed state.

Step B52: determining whether the first side is in a horizontal state.

When dispensing glue on the display panel 10, in order to avoid a collision between a dispensing head 40 and the display panel 10 which resulting in damage to the display panel 10, and at the same time to improve the accuracy of dispensing glue on the display panel 10, it is necessary to ensure that the position to be dispensed of the display panel 10 is in a horizontal state. Therefore, before the glue is dispensed on the first side of the display panel 10, it is necessary to ensure that the first side of the display panel 10 is in a horizontal state so as to ensure that the dispensing head 40 does not collide with the display panel 10, thereby avoiding damage to the display panel 10 and improving the accuracy of the dispensing of the display panel 10.

Step B53: calibrating the display panel so that the first side is in the horizontal state, when the first side is not in the horizontal state.

It can be understood that the display panel 10 is fixed between the dispensing platform 20 and the pressure retaining plate 30, and the dispensing platform 20 can drive the display panel 10 to move by moving the dispensing platform 20. Therefore, by moving the dispensing platform 20, the position of the display panel 10 can be calibrated so that the first side of the display panel 10 is in the horizontal state.

Step B54: when the first side is in the horizontal state, rotating the dispensing platform to a second preset angle so that a second side of the display panel is in the waiting-to-be-dispensed state.

As shown in FIGS. 6-7, specifically, when the first side is in a horizontal state, the dispensing platform 20 is rotated 90° counterclockwise to a second preset angle while keeping the plane in which the dispensing platform 20 is located unchanged. When the dispensing platform 20 reaches the second preset angle, the second side of the display panel 10 is in a waiting-to-be-dispensed state. The second preset angle refers to an angle at which the dispensing platform is located when the second side of the display panel is in the waiting-to-be-dispensed state.

Step B55: determining whether the second side is in the horizontal state.

When dispensing glue on the display panel 10, in order to avoid a collision between a dispensing head 40 and the display panel 10 which resulting in damage to the display panel 10, and at the same time to improve the accuracy of dispensing glue on the display panel 10, it is necessary to ensure that the position to be dispensed of the display panel 10 is in a horizontal state. Therefore, before the glue is dispensed on the second side of the display panel 10, it is necessary to ensure that the second side of the display panel 10 is in a horizontal state so as to ensure that the dispensing head 40 does not collide with the display panel 10, thereby avoiding damage to the display panel 10 and improving the accuracy of the dispensing of the display panel 10.

Step B56: when the second side is in the horizontal state, rotating the dispensing platform to a third preset angle so that a third side of the display panel is in the waiting-to-be-dispensed state.

Specifically, as shown in FIGS. 7-8, when the second side is in the horizontal state, the dispensing platform 20 is again rotated 90° counterclockwise to a third preset angle while keeping the plane in which the dispensing platform 20 is located unchanged. When the dispensing platform 20 reaches the third preset angle, the third side of the display panel 10 is in the waiting-to-be-dispensed state. The third preset angle refers to an angle at which the dispensing platform is located when the third side of the display panel is in the waiting-to-be-dispensed state.

Step B57: determining whether the third side is in the horizontal state.

When dispensing glue on the display panel 10, in order to avoid a collision between a dispensing head 40 and the display panel 10 which resulting in damage to the display panel 10, and at the same time to improve the accuracy of dispensing glue on the display panel 10, it is necessary to ensure that the position to be dispensed of the display panel 10 is in a horizontal state. Therefore, before the glue is dispensed on the third side of the display panel 10, it is necessary to ensure that the third side of the display panel 10 is in a horizontal state so as to ensure that the dispensing head 40 does not collide with the display panel 10, thereby avoiding damage to the display panel 10 and improving the accuracy of the dispensing of the display panel 10.

Step B58: when the third side is in the horizontal state, the display panel satisfies the first dispensing condition.

It will be understood that when the first side of the display panel is in the waiting-to-be-dispensed state, the first side is in the horizontal state. When the second side of the display panel is in the waiting-to-be-dispensed state, the second side is in the horizontal state. When the third side of the display panel is in the waiting-to-be-dispensed state, the third side is in the horizontal state. It can be determined that the display panel satisfies the first dispensing condition.

In some embodiments, after determining whether the second side is in a horizontal state, the method may further include:

abandoning the dispensing of the display panel when the second side is not in the horizontal state.

It is understood that, when the second side is not in the horizontal state, the dispensing of the display panel is abandoned, and the product yield of the display panel can be improved.

In some embodiments, after determining whether the third side is in the horizontal state, the method may further include:

abandoning the dispensing of the display panel when the third side is not in a horizontal state.

It will be understood that when the third side is not in the horizontal state, the dispensing of the display panel is abandoned, and the product yield of the display panel can be improved.

Figure 9A:
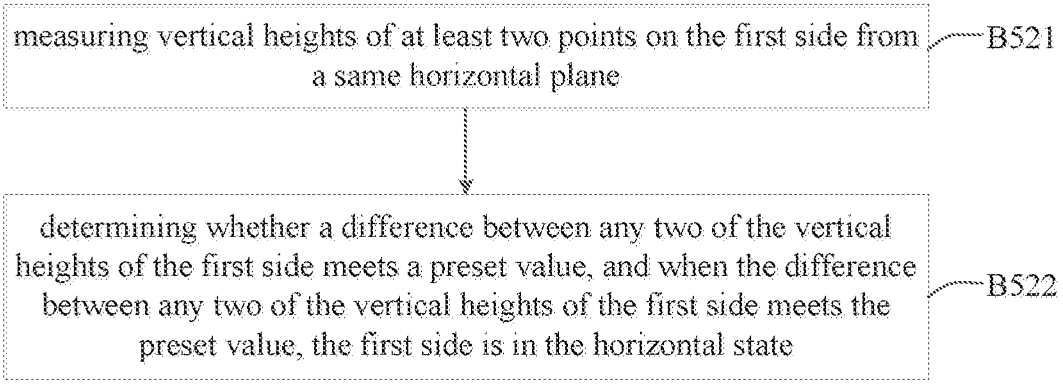
FIG. 9*a* is a flowchart for determining whether the first side is in a horizontal state in a dispensing method for the display panel according to the embodiment of the present application.

Referring to FIG. 9*a*, FIG. 9*a* is a flowchart for determining whether a first side is in a horizontal state in a dispensing method for a display panel according to the present application.

The step of determining whether the first side is in the horizontal state may include:

Step B521: measuring vertical heights of at least two points on the first side from a same horizontal plane.

An infrared detector may be used to measure the vertical heights of at least two points on the first side from a same horizontal plane. By measuring the vertical heights of at least two points on the first side from a same horizontal plane, it is possible to determine whether the first side is in the horizontal state.

Step B522: determining whether a difference between any two of the vertical heights of the first side satisfies a preset value, and when the difference between any two of the vertical heights of the first side satisfies the preset value, the first side is in the horizontal state.

In this embodiment, the preset value refers to a range that needs to be satisfied by the difference between vertical heights of two points from a same horizontal plane when judging whether a line where any two points are located is parallel to the horizontal plane. When the difference between the vertical heights of any two points of the first side from a same horizontal plane is in a range of 2 mm to 6 mm, the first side can be determined to be in the horizontal state. Specifically, when the difference between the vertical heights of any two points from a same horizontal plane is 2 mm, 3 mm, 4 mm, 5 mm, or 6 mm, the first side is in the horizontal state.

Figure 9B:
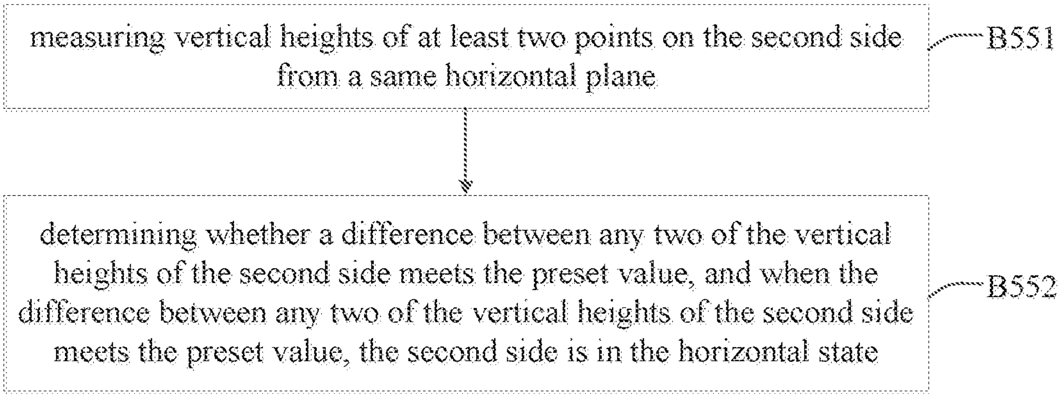
FIG. 9*b* is a flowchart for determining whether a second side is in a horizontal state in a dispensing method for the display panel according to the embodiment of the present application.

Referring to FIG. 9*b*, FIG. 9*b* is a flowchart for determining whether a second side is a horizontal state in a dispensing method for a display panel according to the present application.

The step of determining whether the second side is in a horizontal state may include:

Step B551: measuring vertical heights of at least two points on the second side from a same horizontal plane.

An infrared detector may be used to measure the vertical heights of at least two points on the second side from a same horizontal plane. By measuring the vertical heights of at least two points on the second side from a same horizontal plane, it is possible to determine whether the second side is in the horizontal state.

Step B552: determining whether a difference between any two of the vertical heights of the second side satisfies the preset value, and when the difference between any two of the vertical heights of the second side satisfies the preset value, the second side is in the horizontal state.

When the difference between the vertical heights of any two points on the second side from a same horizontal plane is in the range of 2 mm to 6 mm, the second side is in the horizontal state. Specifically, when the difference between the vertical heights of any two points from a same horizontal plane is 2 mm, 3 mm, 4 mm, 5 mm or 6 mm, the second side is in the horizontal state.

Figure 9C:
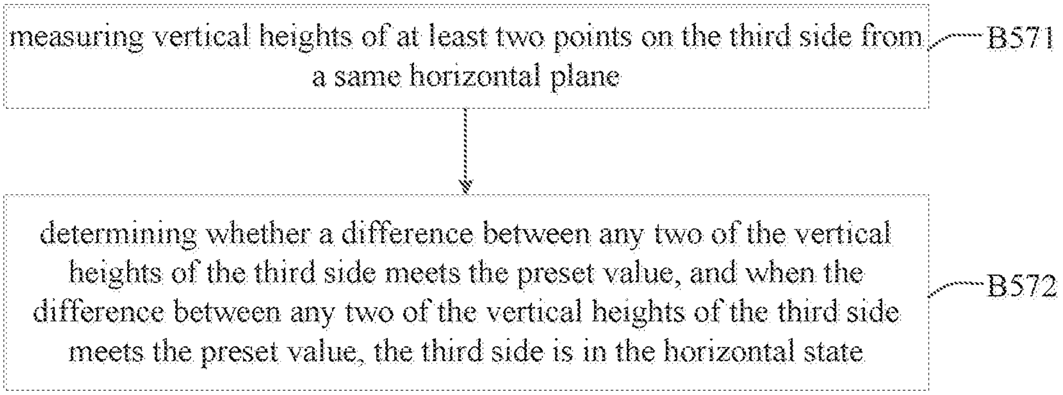
FIG. 9*c* is a flowchart for determining whether a third side is in a horizontal state in a dispensing method for the display panel according to the embodiment of the present application.

Referring to FIG. 9*c*, FIG. 9*c* is a flowchart for determining whether a third side is in a horizontal state in a dispensing method for a display panel according to the present application.

The step of determining whether the third side is in the horizontal state may include:

Step B571: measuring the vertical heights of at least two points on the third side from a same horizontal plane.

An infrared detector may be used to measure the vertical heights of at least two points on the third side from a same horizontal plane. By measuring the vertical heights of at least two points on the third side from a same horizontal plane, it is possible to determine whether the third side is in the horizontal state.

Step B572: determining whether a difference between any two of the vertical heights of the third side satisfies the preset value, and when the difference between any two of the vertical heights of the third side satisfies the preset value, the third side is in the horizontal state.

When the difference between the vertical heights of any two points of the third side from a same horizontal plane is within the range of 2 mm to 6 mm, the third side can be determined to be in the horizontal state. Specifically, when the difference between the vertical heights of any two points from a same horizontal plane is 2 mm, 3 mm, 4 mm, 5 mm or 6 mm, the third side is the horizontal state.

Figure 10:
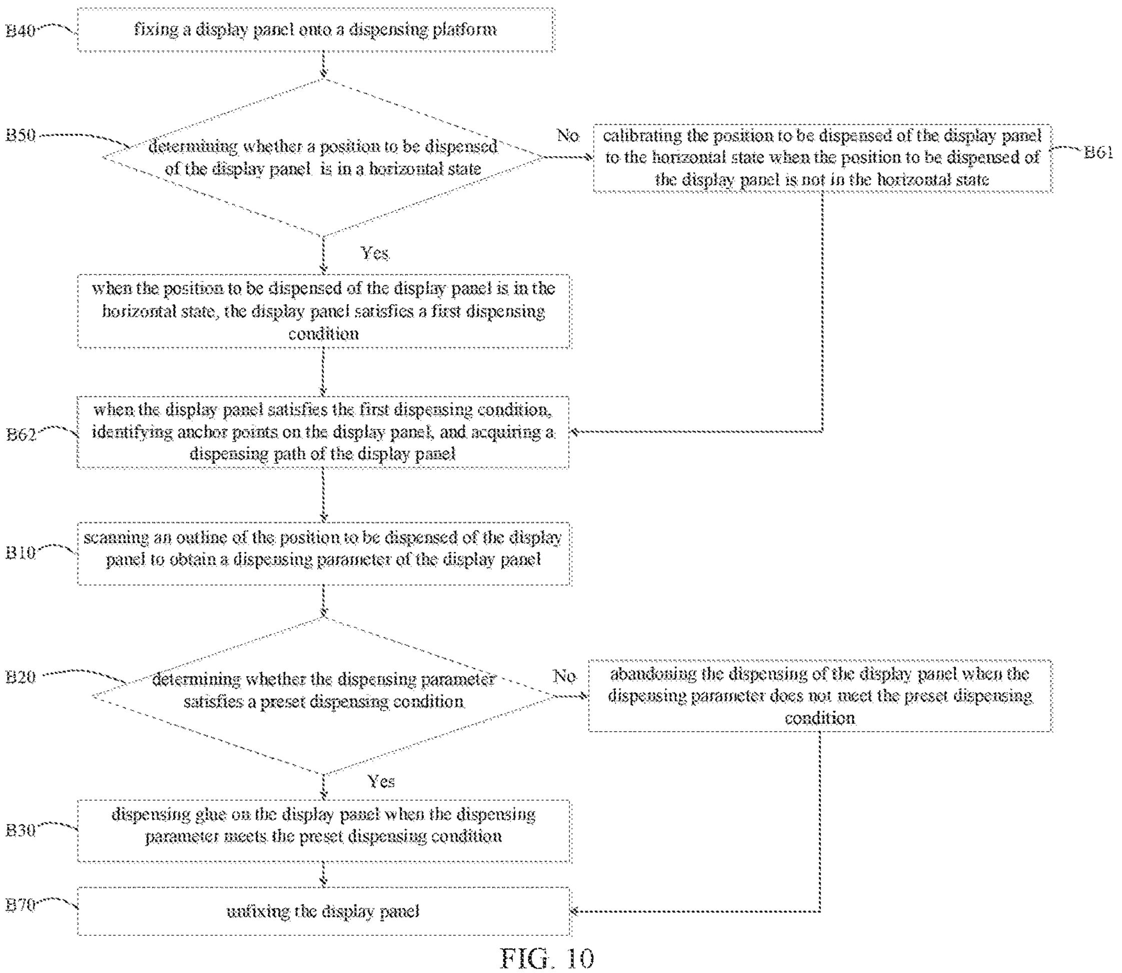
FIG. 10 is a flowchart of a third embodiment of a dispensing method for a display panel according to the present application.

Referring to FIG. 10, FIG. 10 is a flowchart of a third embodiment of a dispensing method for a display panel according to the present application.

The display panel is fixed to the dispensing platform; it is determined whether a position to be dispensed of the display panel is in a horizontal state; an outline of the position to be dispensed of a display panel is scanned, and dispensing parameters of the display panel are obtained; it is determined whether the dispensing parameters meet preset dispensing conditions; when the dispensing parameters meet the preset dispensing conditions, glue is dispensed on the display panel, as described above. Details are not described here.

The third embodiment of the dispensing method for the display panel provided in the present application differs from the second embodiment thereof in that: when the display panel satisfies the first dispensing condition, the method may further include:

Step B62: when the display panel satisfies the first dispensing condition, identifying an anchor point on the display panel and acquiring a dispensing path of the display panel.

The anchor point on the display panel can be identified by a camera, and the dispensing path of the display panel can be acquired. In the present application, the dispensing path of the display panel can be obtained by identifying the anchor points on the display panel, and the accuracy of the dispensing of the display panel can be improved by dispensing the glue according to the dispensing path of the display panel.

In some embodiments, the anchor points include at least a first anchor point, a second anchor point, a third anchor point, a fourth anchor point, a fifth anchor point, and a sixth anchor point. The first side includes at least the first anchor point and the second anchor point. The second side includes at least the third anchor point and the fourth anchor point. The third side includes at least the fifth anchor point and the sixth anchor point.

It will be appreciated that there may be a plurality of anchor points. In the present application, as an example, each side has two anchor points, which cannot constitute a limitation to the present application. In the present application, the anchor points include at least the first anchor point, the second anchor point, the third anchor point, the fourth anchor point, the fifth anchor point, and the sixth anchor point, the first side includes at least the first anchor point and the second anchor point, the second side includes at least the third anchor point and the fourth anchor point, the third side includes at least the fifth anchor point and the sixth anchor point, which may improve the accuracy of acquiring the dispensing path, and may improve the accuracy of the dispensing on the display panel.

In some embodiments, the first anchor point is a start point of the dispensing path, and the sixth anchor point is an end point of the dispensing path; or the first anchor point is the end point of the dispensing path, and the sixth anchor point is the start point of the dispensing path.

It will be understood that when the dispensing of the display panel is started from the first anchor point, the first anchor point is the start point of the dispensing path, and when the dispensing of the display panel is started from the sixth anchor point, the sixth anchor point is the start point of the dispensing path, and the first anchor point is the end point of the dispensing path.

Figure 11:
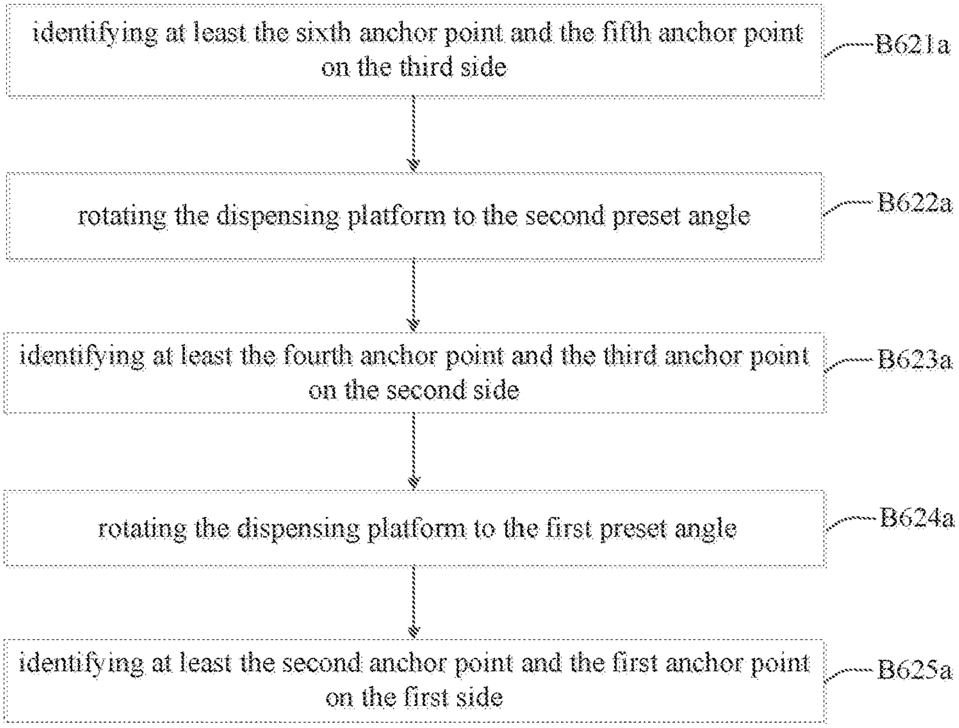
FIG. 11 is a flowchart of a first embodiment of identifying an anchor point on a display panel in a dispensing method for the display panel according to the present application.

Referring to FIG. 11, FIG. 11 is a flowchart of a first embodiment of identifying an anchor point on a display panel in a dispensing method for a display panel according to the present application.

Step B621*a*: identifying at least the sixth anchor point and the fifth anchor point on the third side.

When the third side of the display panel is in the horizontal state, at least the sixth and the fifth anchor points located on the third side are identified. It will be appreciated that two anchor points may determine a straight line. In the present application, by identifying the two anchor points on the third side, the dispensing path on the third side can be determined. The glue is dispensed on the third side according to the dispensing path, thereby improving the accuracy of the dispensing on the third side.

Step B622*a*: rotating the dispensing platform to reach the second preset angle.

In the present embodiment, when the third side of the display panel is in the horizontal state, the plane in which the dispensing platform is located is kept unchanged, the dispensing platform is rotated 90° counterclockwise to reach the second preset angle, and the second side of the display panel is in the waiting-to-be-dispensed state at this time.

Step B623*a*: identifying at least the fourth anchor point and the third anchor point on the second side.

It will be appreciated that two anchor points may determine a straight line. By identifying the two anchor points on the second side, a dispensing path on the second side can be determined. The glue is dispensed on the second side according to the dispensing path, thereby improving the accuracy of the dispensing on the second side.

Step B624*a*: rotating the dispensing platform to the first preset angle.

In the present embodiment, when the second side of the display panel is in the horizontal state, the plane on which the dispensing platform is located is kept unchanged, the dispensing platform is rotated 90° counterclockwise to reach the first preset angle, and the first side of the display panel is in the waiting-to-be-dispensed state at this time.

Step B625*a*: identifying at least the second anchor point and the first anchor point on the first side.

It will be appreciated that two anchor points may determine a straight line. By identifying the two anchor points on the first side, a dispensing path on the first side can be determined. The glue is dispensed on the first side according to the dispensing path, thereby improving the accuracy of the dispensing on the first side.

By identifying the sixth anchor point and the fifth anchor point on the third side of the display panel, the fourth anchor point and the third anchor point on the second side, and the second anchor point and the first anchor point on the first side, the dispensing paths of the display panel can be acquired, the glue is dispensed on the display panel according to the dispensing paths, so that the accuracy of the dispensing on the display panel can be improved.

Figure 12:
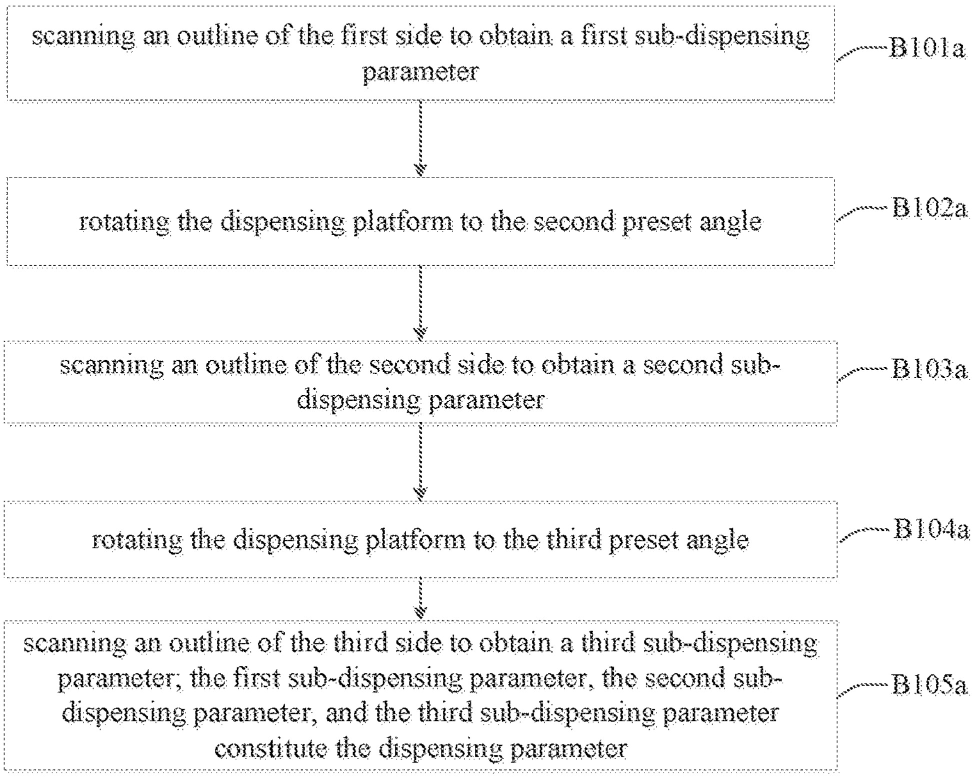
FIG. 12 is a flowchart of a first embodiment of scanning an outline of a position to be dispensed of a display panel in a dispensing method for the display panel according to the present application.

Referring to FIG. 12, FIG. 12 is a flowchart of a first embodiment of scanning an outline of a position to be dispensed of the display panel in a dispensing method for a display panel according to the present application.

Step B101*a*: scanning an outline of the first side to obtain a first sub-dispensing parameter.

After the anchor points of the display panel are identified, the first side of the display panel at this time is in the waiting-to-be-dispensed state. A dispensing parameter of the first side, i.e., the first sub-dispensing parameter, is obtained by scanning an outline of the first side. The first sub-dispensing parameter includes a volume of the position to be dispensed on the first side. Specifically, a height and a width of the position to be dispensed on the first side can be obtained by scanning the position to be dispensed on the first side by a 2D line laser, and then the volume of the position to be dispensed on the first side can be obtained by combining the thickness of the display panel. It will be understood that the first side may have one, two or more positions to be dispensed. A number of positions to be dispensed on the first side is not limited here.

Step B102*a*: rotating the dispensing platform to reach the second preset angle.

In the present embodiment, when the first side of the display panel is in the waiting-to-be-dispensed state, the plane on which the dispensing platform is located is kept unchanged, the dispensing platform is rotated 900 clockwise to reach the second preset angle, and then the second side of the display panel is in the waiting-to-be-dispensed state.

Step B103*a*: scanning an outline of the second side to obtain a second sub-dispensing parameter.

A dispensing parameter of the second side, i.e., the second sub-dispensing parameter, is obtained by scanning an outline of the second side. The second sub-dispensing parameter includes a volume of the position to be dispensed on the second side. The height and width of the position to be dispensed on the second side can be obtained by scanning the position to be dispensed on the second side by a 2D line laser, and then the volume of the position to be dispensed on the second side can be obtained by using the thickness of the display panel. It will be understood that the second side may have one, two or more positions to be dispensed. The number of positions to be dispensed on the second side is not limited herein.

Step B104*a*: rotating the dispensing platform to reach the third preset angle.

In the embodiment of the present application, when the second side of the display panel is in the waiting-to-be-dispensed state, the plane on which the dispensing platform is located is kept unchanged, the dispensing platform is rotated 90° clockwise to reach the third preset angle, and at this time, the third side of the display panel is in the waiting-to-be-dispensed state.

Step B105*a*: scanning an outline of the third side to obtain a third sub-dispensing parameter; the first sub-dispensing parameter, the second sub-dispensing parameter, and the third sub-dispensing parameter constitute the dispensing parameter.

A dispensing parameter of the third side, i.e., the third sub-dispensing parameter, is obtained by scanning an outline of the third side. The third sub-dispensing parameter includes a volume of the position to be dispensed on the third side. The height and width of the position to be dispensed on the third side can be obtained by scanning the position to be dispensed on the third side by a 2D line laser, and then the volume of the position to be dispensed on the s third side can be obtained by using the thickness of the display panel. It will be understood that the third side may have one, two or more positions to be dispensed. The number of positions to be dispensed on the third side is not limited herein. The first sub-dispensing parameter, the second sub-dispensing parameter, and the third sub-dispensing parameter constitute the dispensing parameter of the display panel.

The first sub-dispensing parameter is acquired by scanning the outline of the first side, the second sub-dispensing parameter is acquired by scanning the outline of the second side, the third sub-dispensing parameter is acquired by scanning the outline of the third side, the first sub-dispensing parameter, the second sub-dispensing parameter, and the third sub-dispensing parameter constitute the dispensing parameter of the display panel, so that the dispensing parameter of the display panel can be obtained, and the accuracy of the dispensing on the display panel can be improved by dispensing the glue on the display panel according to the dispensing path.

Figure 13:
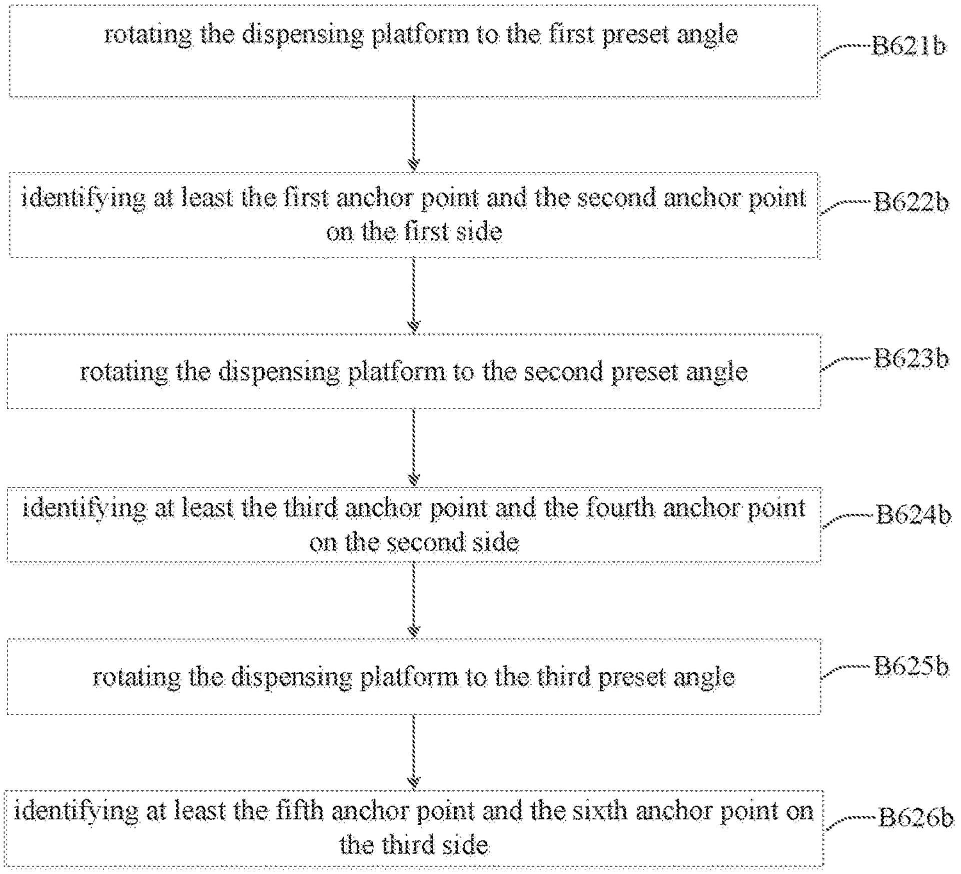
FIG. 13 is a flowchart of a second embodiment of identifying an anchor point on a display panel in a dispensing method for the display panel according to the present application.

Referring to FIG. 13, FIG. 13 a flowchart of a second embodiment of identifying an anchor point on a display panel in a dispensing method for the display panel according to the present application.

Step B621*b*: rotating the glue dispensing platform to reach the first preset angle.

After it is determined that the third side of the display panel is in the horizontal state, the first side of the display panel may be in the waiting-to-be-dispensed state after rotating the dispensing platform to reach the first preset angle. In the present embodiment, the dispensing platform is rotated 180° clockwise or counterclockwise to reach the first preset angle while keeping the plane on which the dispensing platform is located unchanged.

Step B622*b*: identifying at least the first anchor point and the second anchor point located on the first side.

It will be appreciated that two anchor points may determine a straight line. By identifying the at least two anchor points on the first side, the dispensing path on the first side can be determined, thereby improving the accuracy of the dispensing on the first side.

Step B623*b*: rotating the dispensing platform to reach the second preset angle.

In this embodiment, the dispensing platform is rotated 90° clockwise to reach the second preset angle while keeping the plane on which the dispensing platform is located unchanged.

Step B624*b*: identifying at least the third anchor point and the fourth anchor point located on the second side.

It will be appreciated that two anchoring points may determine a straight line. By identifying the at least two anchor points on the second side, the dispensing path on the second side can be determined, thereby improving the accuracy of the dispensing on the second side.

Step B625*b*: rotating the dispensing platform to reach the third preset angle.

In this embodiment, the dispensing platform is rotated 90° clockwise to reach the third preset angle while keeping the plane on which the dispensing platform is located unchanged.

Step B626*b*: identifying at least the fifth anchor point and the sixth anchor point located on the third side.

It will be appreciated that two anchor points may determine a straight line. By identifying the at least two anchor points on the third side, the dispensing path on the third side can be determined, thereby improving the accuracy of the dispensing on the third side.

By identifying the first and second anchor points on the first side, the third and fourth anchor points on the second side, and the fifth and sixth anchor points on the third side of the display panel, the dispensing paths of the display panel can be obtained, and the accuracy of the dispensing on the display panel can be improved by dispensing the glue on the display panel according to the dispensing paths.

Figure 14:
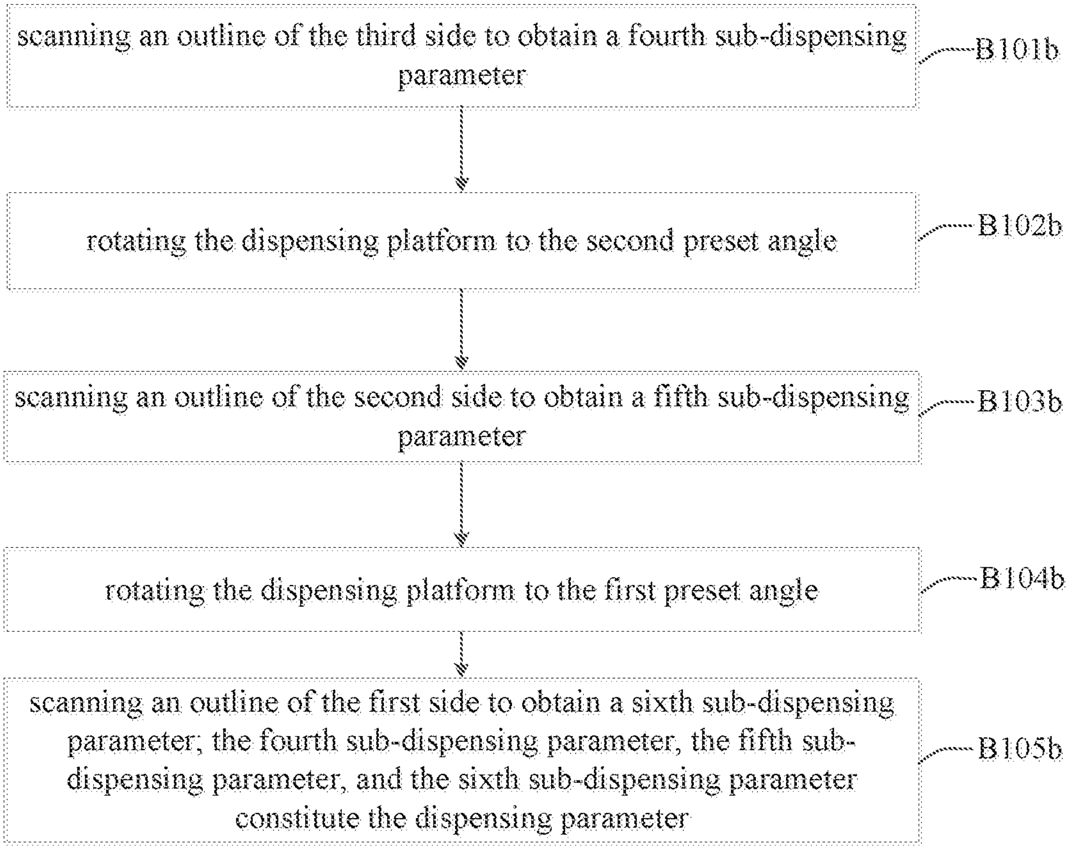
FIG. 14 is a flowchart of a second embodiment of scanning an outline of a position to be dispensed of a display panel in a dispensing method for the display panel according to the present application.

Referring to FIG. 14, FIG. 14 is a flowchart of a second embodiment of scanning an outline of the display panel in a dispensing method for a display panel according to the present application.

Step B101*b*: scanning an outline of the third side to obtain a fourth sub-dispensing parameter.

After the anchor points of the display panel are identified, at this time, the third side of the display panel is in the waiting-to-be-dispensed state. By scanning the outline of the third side, the dispensing parameter of the third side, that is, the fourth sub-dispensing parameter, can be obtained. It should be explained that the fourth sub-dispensing parameter is same as the third sub-dispensing parameter, and they both are the dispensing parameters of the third side obtained by scanning the outline of the third side.

Step B102*b*: rotating the dispensing platform to reach the second preset angle.

In this embodiment, the dispensing platform is rotated 90° counterclockwise to reach the second preset angle while keeping the plane on which the dispensing platform is located unchanged.

Step B103*b*: scanning an outline of the second side to obtain a fifth sub-dispensing parameter.

The dispensing parameter of the fifth side, that is, the fifth sub-dispensing parameter, is obtained by scanning the outline of the second side. It should be explained that the fifth sub-dispensing parameter is same as the second sub-dispensing parameter, and they both are the dispensing parameters of the second side obtained by scanning the outline of the second side.

Step B104*b*: rotating the dispensing platform to reach the first preset angle.

In this embodiment, the dispensing platform is rotated 90° counterclockwise to reach the first preset angle while keeping the plane on which the dispensing platform is located unchanged.

Step B105*b*: scanning an outline of the first side to obtain a sixth sub-dispensing parameter; the fourth sub-dispensing parameter, the fifth sub-dispensing parameter, and the sixth sub-dispensing parameter constitute the dispensing parameter.

In the present application, the outline of the third side is scanned to acquire the fourth sub-dispensing parameter, the outline of the second side is scanned to acquire the fifth sub-dispensing parameter, and the outline of the first side is scanned to acquire the sixth sub-dispensing parameter. The fourth sub-dispensing parameter, the fifth sub-dispensing parameter, and the sixth sub-dispensing parameter constitute the dispensing parameter of the display panel. The accuracy of dispensing on the display panel can be improved by dispensing glue on the display panel according to the dispensing parameter.

In some embodiments of the present application, the step of dispensing glue on the display panel includes the following step:

Step B31: dispensing glue on the display panel according to the dispensing path.

The accuracy of dispensing glue on the display panel can be improved by dispensing glue on the display panel according to the dispensing path.

Specifically, a process of dispensing glue on the display panel is similar to the process of scanning the outline of the position to be dispensed of the display panel, and details are not described here.

In some embodiments, when the dispensing parameter satisfies a preset dispensing parameter, the dispensing parameter is recorded as first data; when the dispensing parameter does not satisfy the preset dispensing parameter, the dispensing parameter is recorded as the second data.

In the present application, the dispensing parameter that meet the preset dispensing parameter is recorded as the first data, and the dispensing parameter that does not meet the preset dispensing parameter is recorded as the second data, thereby accurately monitoring the accuracy of dispensing glue on the display panel, timely adjusting the dispensing device to cope with different display panels, and reducing the production cost of the display panel and stability of a warning device.

Figure 15:
FIG. 15 is a flowchart of a fourth embodiment of a dispensing method for a display panel according to the present application.

Referring to FIG. 15, FIG. 15 is a flowchart of a fourth embodiment of a dispensing method for a display panel according to the present application.

The present application also provides the flowchart of the fourth embodiment of the dispensing method of the display panel.

Step B101: fixing a display panel on a dispensing platform.

Step B102: rotating the dispensing platform to a first preset angle so that a first side of the display panel is in a waiting-to-be-dispensed state.

Step B103: measuring vertical heights of at least two points on the first side from a same horizontal plane.

Step B104: determining whether a difference between any two of the vertical heights of the first side satisfies a preset value, and when the difference between any two of the vertical heights of the first side satisfies the preset value, the first side is in a horizontal state.

Step B105: calibrating the display panel so that the first side is in the horizontal state when the first side is not in the horizontal state.

Step B106: identifying at least a first anchor point and a second anchor point on the first side to obtain a first sub-dispensing path.

Step B107: scanning an outline of the first side to obtain a first sub-dispensing parameter.

Step B108: rotating the dispensing platform to a second preset angle so that a second side of the display panel is in the waiting-to-be-dispensed state.

Step B109: measuring the vertical heights of at least two points on the second side from a same horizontal plane.

Step B110: determining whether a difference between any two of the vertical heights on the second side satisfies a preset value, and when the difference between any two of the vertical heights on the second side satisfies the preset value, the second side is in a horizontal state.

Step B111: identifying at least a third anchor point and a fourth anchor point on the second side to obtain a second sub-dispensing path.

Step B112: scanning an outline of the second side to obtain a second sub-dispensing parameter.

Step B113: rotating the dispensing platform to a third preset angle so that a third side of the display panel is in the waiting-to-be-dispensed state.

Step B114: measuring the vertical heights of at least two points on the third side from a same horizontal plane.

Step B115: determining whether a difference between any two of the vertical heights on the third side satisfies a preset value, and when the difference between any two of the vertical heights on the third side satisfies the preset value, the third side is in a horizontal state.

Step B116: identifying at least a fifth anchor point and a sixth anchor point on the third side to obtain a third sub-dispensing path.

Step B117: scanning an outline of the third side to obtain a third sub-dispensing parameter.

Step B118: determining whether the first sub-dispensing parameter, the second sub-dispensing parameter, and the third sub-dispensing parameter meet a preset dispensing condition.

Step B119: when the first sub-dispensing parameter, the second sub-dispensing parameter, and the third sub-dispensing parameter meet the preset dispensing condition, dispensing glue on the display panel according to the first sub-dispensing path, the second sub-dispensing path, and the third sub-dispensing path.

When the dispensing parameter does not meet the preset dispensing condition, the dispensing of the display panel is abandoned.

Specifically, for the steps in the fourth embodiment of the dispensing method for the display panel provided in this application, please refer to the second embodiment or the third embodiment, and details are not repeated here.

The dispensing method of the display panel provided in the present application may improve the product yield of the display panel by monitoring whether the display panel to be dispensed satisfies the dispensing conditions, dispensing glue on the display panel that satisfies the dispensing conditions, and abandoning the dispensing of the display panel that does not meet the dispensing conditions.

In some embodiments, after the step of determining whether the difference between any two vertical heights on the second side satisfies a preset value, the method may further include:

when the difference between any two vertical heights on the second side does not meet the preset value, the second side is not in the horizontal state, and dispensing glue on the display panel is abandoned.

It can be understood that, when the second side is not in the horizontal state, dispensing glue on the display panel is abandoned, which can improve the product yield of the display panel.

In some embodiments, after the step of determining whether the difference between any two vertical heights on the third side satisfies a preset value, the method may further include:

when the difference between any two vertical heights on the third side does not meet the preset value, the third side is not in a horizontal state, and dispensing glue on the display panel is abandoned.

It will be understood that when the third side is not in the horizontal state, dispensing glue on the display panel is abandoned, which can improve the product yield of the display panel.

Figure 16:
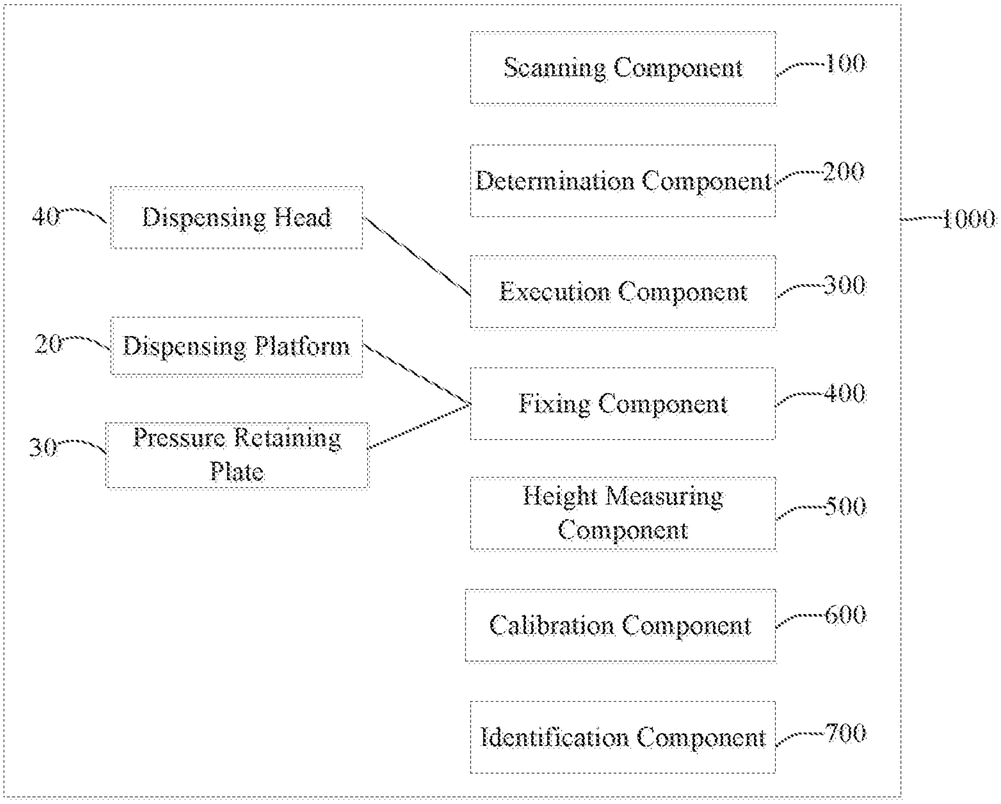
FIG. 16 is a schematic structural diagram of a dispensing device for a display panel according to an embodiment of the present application.

Referring to FIG. 16, FIG. 16 is a schematic structural diagram of a dispensing device for a display panel according to an embodiment of the present application.

A dispensing device 1000 for a display panel includes a scanning component 100, a determination component 200, and an execution component 300. The scanning component 100 is configured to scan an outline of a position to be dispensed of the display panel to obtain dispensing parameters of the display panel. The scan component 100 may be a 2D line laser or a 2D high-definition camera. The determination component 200 is configured to determine whether the dispensing parameter satisfies a preset dispensing parameter. The determination component 200 may be a terminal having a processor. The execution component 300 is configured to receive an instruction from the determination component 200, to dispense glue on the display panel when the dispensing parameter satisfies the preset dispensing condition, and to abandon the dispensing on the display panel when the dispensing parameter does not meet the preset dispensing condition. The execution component 300 is a programmable logic controller. Specifically, the execution component 300 may include a dispensing head 40.

In some embodiments, the dispensing device 1000 of the display panel further includes a fixing component 400. The fixing component 400 is for fixing the display panel. The fixing component 400 includes a dispensing platform 20 and a pressure retaining plate 30. The dispensing device 1000 of the display panel further includes an evacuating mean connected to the dispensing platform 20. In conjunction with FIG. 4, a plurality of vacuum holes 21 are formed in a central position of the dispensing platform 20. A plurality of magnetic blocks 22 are provided at edge positions of the dispensing platform 20. The pressure retaining plate 30 is formed of a magnetic material. The display panel to be dispensed is placed at the central position of the dispensing platform 20, and then the pressure retaining plate 30 covers above the display panel 10. The pressure retaining plate 30 and the magnetic block 22 can fix the display panel 10. The evacuating device connected to the dispensing platform 20 is activated, and the display panel 10 to be dispensed is fixed between the dispensing platform 20 and the pressure retaining plate 30 by vacuuming.

In some embodiments, the dispensing device 1000 of the display panel further includes a height measuring component 500. The height measuring component 500 is configured to measure a vertical distance between a point in a plane in which a position to be dispensed of the display panel is located and a same horizontal plane for determining whether the position to be dispensed of the display panel is in a horizontal state. The height measuring component 500 may include an infrared detector.

In some embodiments, the dispensing device 1000 of the display panel further includes a calibration component 600. The calibration component 600 is used to calibrate the position to be dispensed of the display panel to a horizontal state. The calibration component 600 may include a shaft.

In some embodiments, the dispensing device 1000 of the display panel further includes an identification component 700. The identification component 700 is configured to identify the anchor point of the display panel and obtain the dispensing path of the display panel. The identification component 700 may include a camera.

The present application provides a dispensing method and a dispensing device for a display panel. The dispensing method and the dispensing device for the display panel provided in the present application can monitor the display panel to be dispensed, dispense glue on the display panel meeting the dispensing conditions, and abandon dispensing glue on the display panel not meeting the dispensing conditions, thereby improving the product yield of the display panel.

In conclusion, although the embodiments of the present application are described in detail above, the foregoing embodiments are not intended to limit the present application, and those skilled in the art should understand that they may still modify the technical solutions described in the foregoing embodiments, or make replace some technical features thereof with equivalent replacements; these modifications or substitutions do not deviate the nature of the respective solutions from the scope of the solutions of the embodiments of the present application.

What is claimed is:

1. A dispensing method for a display panel, wherein, the dispensing method comprises:

scanning an outline of a position to be dispensed of the display panel to obtain a dispensing parameter of the display panel;

determining whether the dispensing parameter satisfies a preset dispensing condition; and dispensing glue on the display panel when the dispensing parameter satisfies the preset dispensing condition;

wherein the preset dispensing condition is a range of dispensing volume that the dispensing device needs to satisfy to perform a dispensing operation.

2. The dispensing method for the display panel of claim 1, wherein before the step of scanning the outline of the position to be dispensed of the display panel, the dispensing method further comprises:

fixing the display panel on a dispensing platform;

determining whether the position to be dispensed of the display panel is in a horizontal state; and calibrating the position to be dispensed of the display panel to the horizontal state when the position to be dispensed of the display panel is not in the horizontal state.

3. The dispensing method for the display panel of claim 2, wherein the steps of determining whether the position to be dispensed of the display panel is in the horizontal state, and calibrating the display panel to the horizontal state when the position to be dispensed of the display panel is not in the horizontal state, comprise:

rotating the dispensing platform to a first preset angle so that a first side of the display panel is in a waiting-to-be-dispensed state;

determining whether the first side is in the horizontal state;

calibrating the first side of the display panel to the horizontal state when the first side is not in the horizontal state;

rotating the dispensing platform to a second preset angle when the first side is in the horizontal state so that a second side of the display panel is in the waiting-to-be-dispensed state;

determining whether the second side is in the horizontal state;

rotating the dispensing platform to a third preset angle when the second side is in the horizontal state so that a third side of the display panel is in the waiting-to-be-dispensed state; and determining whether the third side is in the horizontal state;

the display panel satisfies a first dispensing condition when the third side is in the horizontal state.

4. The dispensing method for the display panel of claim 3, wherein the step of determining whether the first side is in the horizontal state comprises:

measuring vertical heights of at least two points on the first side from a same horizontal plane; and determining whether a difference between any two of the vertical heights of the first side satisfies a preset value, the first side is in the horizontal state when the difference between any two of the vertical heights on the first side satisfies the preset value;

the step of determining whether the second side is in the horizontal state comprises:

measuring vertical heights of at least two points on the second side from a same horizontal plane; and determining whether a difference between any two of the vertical heights on the second side satisfies the preset value, the second side is in the horizontal state when the difference between any two of the vertical heights on the second side satisfies the preset value; and the step of determining whether the third side is in the horizontal state comprises:

measuring vertical heights of at least two points on the third side from a same horizontal plane; and determining whether a difference between any two of the vertical heights on the third side satisfies the preset value, and the third side is in the horizontal state when the difference between any two of the vertical heights on the third side satisfies the preset value.

5. The dispensing method for the display panel of claim 3, wherein when the display panel satisfies the first dispensing condition, anchor points on the display panel are identified, and a dispensing path of the display panel is acquired.

6. The dispensing method for the display panel of claim 5, wherein the anchor points comprise at least a first anchor point, a second anchor point, a third anchor point, a fourth anchor point, a fifth anchor point, and a sixth anchor point; the first side comprises at least the first anchor point and the second anchor point, the second side comprises at least the third anchor point and the fourth anchor point, and the third side comprises at least the fifth anchor point and the sixth anchor point.

7. The dispensing method for the display panel of claim 6, wherein a step of identifying the anchor points on the display panel comprises:

identifying at least the sixth anchor point and the fifth anchor point on the third side;

rotating the dispensing platform to the second preset angle;

identifying at least the fourth anchor point and the third anchor point on the second side;

rotating the dispensing platform to the first preset angle; and identifying at least the second anchor point and the first anchor point on the first side.

8. The dispensing method for the display panel of claim 7, wherein the step of scanning the outline of the position to be dispensed of the display panel to obtain the dispensing parameter of the display panel comprises:

scanning an outline of the first side to obtain a first sub-dispensing parameter;

rotating the dispensing platform to the second preset angle;

scanning an outline of the second side to obtain a second sub-dispensing parameter;

rotating the dispensing platform to the third preset angle; and scanning an outline of the third side to obtain a third sub-dispensing parameter, the first sub-dispensing parameter, the second sub-dispensing parameter, and the third sub-dispensing parameter constitute the dispensing parameter.

9. The dispensing method for the display panel of claim 6, wherein a step of identifying the anchor points on the display panel comprises:

rotating the dispensing platform to the first preset angle;

identifying the first anchor point and the second anchor point on the first side;

rotating the dispensing platform to the second preset angle;

identifying the third anchor point and the fourth anchor point on the second side;

rotating the dispensing platform to the third preset angle; and identifying the fifth anchor point and the sixth anchor point on the third side.

10. The dispensing method for the display panel of claim 9, wherein the step of scanning the outline of the position to be dispensed of the display panel to obtain the dispensing parameter of the display panel comprises:

scanning an outline of the third side to obtain a fourth sub-dispensing parameter;

rotating the dispensing platform to the second preset angle;

scanning an outline of the second side to obtain a fifth sub-dispensing parameter;

rotating the dispensing platform to the first preset angle; and scanning an outline of the first side to obtain a sixth sub-dispensing parameter, the fourth sub-dispensing parameter, the fifth sub-dispensing parameter, and the sixth sub-dispensing parameter constitute the dispensing parameter.

11. The dispensing method for the display panel of claim 6, wherein the first anchor point is a start point of the dispensing path, and the sixth anchor point is an end point of the dispensing path; or the first anchor point is the end point of the dispensing path, and the sixth positioning point is the start point of the dispensing path.

12. The dispensing method for the display panel of claim 1, wherein the step of dispensing the glue on the display panel comprises:

dispensing the glue on the display panel according to a dispensing path.

13. The dispensing method for the display panel of claim 1, wherein in a case where a volume tolerance between an actual dispensing volume and a preset dispensing volume is within plus or minus 10%, the dispensing parameter satisfy the preset dispensing condition.

* * * * *